INVENTOR
John W. Taylor, Jr.

United States Patent Office 3,560,972
Patented Feb. 2, 1971

3,560,972
APPARATUS FOR FLEXIBLY WEIGHTING RECEIVED ECHOES IN A MOVING TARGET INDICATOR RADAR
John W. Taylor, Jr., Baltimore, Md., assignor to Westinghouse Electric Corporation, Pittsburgh, Pa., a corporation of Pennsylvania
Filed Nov. 18, 1968, Ser. No. 776,410
Int. Cl. G01s 9/42
U.S. Cl. 343—7.7                              4 Claims

ABSTRACT OF THE DISCLOSURE

A moving target indicator radar system permitting not only flexibility and choice of the interpulse period but also flexibility in the weighting of the pulses. The last received echo pulse and a sequence of previous pulses are provided weighting factors in an arithmetic unit of the radar receiver to provide the benefits of variable interpulse periods without sacrifice of the shape of the clutter notch reception. The weighting factors are selected to be binary in relationship to simplify the arithmetic unit.

CROSS REFERENCES TO RELATED APPLICATIONS

Reference is made to a copending application entitled "Apparatus and Method for Improving the Velocity Response of an MTI Radar by Sinusoidally Varying the Interpulse Period," Ser. No. 772,701, filed Nov. 1, 1968, by Edward C. Watters and Thomas M. Moore and another copending application entitled "An MTI Radar System Utilizing Unique Patterns of Interpulse Period Choices to Simplify Weighting Coefficients for Individual Echo Pulses," Ser. No. 776,409, filed Nov. 18, 1968, by John W. Taylor, Jr. each of which are assigned to the common assignee of the present application.

BACKGROUND OF THE INVENTION

Field of the invention

The present invention relates generally to moving target indicator (MTI) radars and more particularly relates to apparatus for digitally processing variable weighted individual echoes received from a target.

Description of the prior art

The employment of moving target indicators (MTI), to discriminate between radar echoes from moving targets and those from fixed or very slowly moving clutter, is well known. It involves the storage of a sequence of radar echoes and their vector summation in a canceller.

In the past, ultrasonic delay lines have been the most efficient and practical storage medium. Since each different interpulse period demanded a different delay line, both hardware cost and the difficulty of adjustment prevented the employment of more than two or three interpulse periods. Thus efforts to eliminate blind speeds in the velocity response were severely restricted and many regions of severe insensitivity, if not complete blindness, remained.

Storage tubes have been used in place of delay lines, and, more recently, digital storage devices have become competitive in price and superior in stability. These techniques of storage impose no restriction on interpulse period, and this freedom permits the radar designer to make a vast improvement in smoothing the velocity response in the speed range where desired targets are expected.

Unfortunately, there is a penalty associated with variable interpulse period (VIP). When the interpulse period is varied, the derivatives of interpulse period introduce degradation of the ideal clutter notch. One may suppress these degrading terms by making only very gradual changes in the interpulse period, but this is generally impractical because of the limited time in which the VIP sequence must be completed.

SUMMARY OF THE INVENTION

An object of the present invention is to provide apparatus for variably weighting a sequence of received echo pulses to provide the benefits of VIP without sacrificing the shape of the clutter notch.

Another object of the present invention is to provide apparatus for improving the clutter notch by applying binary weighted factors to a sequence of received echo pulses from a target.

Another object of the present invention is to provide apparatus wherein a steep clutter notch is obtained by using four or more pulses without imposing impossible restrictions on how the interpulse period can be varied.

Briefly, the present invention accomplishes the above-cited objects and other objects and advantages by providing summing means in a digital MTI radar system in the form of a multi-pulse canceller. The last received echo pulse and a sequence of pulses previously received are weighted by a plurality of logic elements such as gates to improve the clutter notch. The weighting coefficients are not fixed values but are functions of the time separations between each of the series of echoes being processed. Variation of interpulse period produces a coordinated variation in weighting coefficients to form a time-variable filter.

BRIEF DESCRIPTION OF THE DRAWINGS

Further objects and advantages of the present invention will be more readily apparent from the following detailed description taken in conjunction with the drawings, in which.

In an MTI radar system utilizing a digital canceller, the radar receivers phase detector output is sampled by an analog to digital converter in discrete range intervals. The analog to digital converter output is a digital word corresponding to the input amplitude.

The digital word for each range increment is stored in a separate location in a digital store device, such as a core memory. After one interpulse period, the stored digital word is read out and digitally subtracted from the new analog to digital converter output word. Thus the core memory has introduced a delayed digital word for each range increment, analogous to the delay line in an analog canceller system. There is however no visible restraint on the length of the interpulse period as there is in an analog delay line system.

Moving targets will produce a Doppler phase shift and be detected. Fixed targets will have no phase difference between successive returns and will cancel. The digital substractor output is presented in an analog converter which provides the output MTI video.

Figure 1:
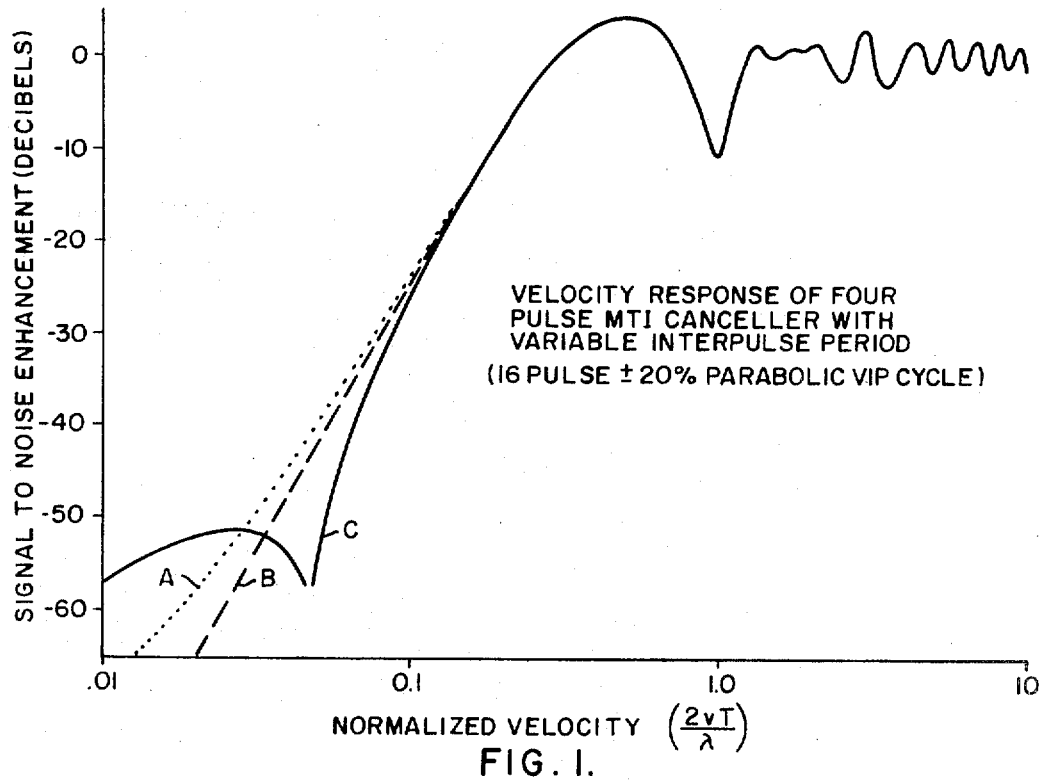
FIG. 1 is a graphical representation of the improved performance attainable when practicing the present invention.

The frequency response of such a simple two pulse canceller does not have as broad a clutter rejection notch in the vicinity of zero frequency, or as flat a pass band response as might be desired. By comparison of more than two successive received pulses and sinusoidally varying the interpulse period, a velocity response as indiacted by the curve A in FIG. 1 is obtained.

The velocity response is shown with the velocity normalized so that $V=1$ represents the blind velocity associated with transmission at the average interpulse period. The ordinate is the enhancement of signal-to-noise ratio by the canceller in decibels. The velocity scale is logarithmic, so the ideal clutter notch associated with N pulses being compared in the canceller, assumes a slope of $(N-1)$; this is the response indicated for a fixed interpulse period system. When the interpulse period is varied, the first $(N-2)$ derivatives of interpulse period introdue degradation of the clutter notch. FIG. 1 shows by the curve A the effect on a four pulse canceller, but the degradation becomes more and more serious as the number of pulses in the canceller is increased.

One may suppress these degrading terms by making only very gradual changes in interpulse period, but this is generally impractical because of the limited time in which the VIP sequence must be completed. In order to insure the detection of a desired target, the VIP sequence must be completed within the time that the two-way beam pattern scans over the target. If the radar must detect not only the presence of the target but its location to a fraction of a beamwidth, several VIP sequences must be completed during the dwell time. Otherwise the echo will be strongest when the interpulse period is optimum, not when the antenna beam is centered on the target.

The velocity response curve A is obtained with about as gradual a VIP cycle as most radar dwell times can tolerate, the utilized pattern of deviation from average interpulse period is tabulated below:

```
-21.30
-20.63
-17.29
-11.27
  7.43
 14.78
 19.46
 21.47
 20.80
 17.46
 11.44
  2.75
- 7.26
-14.61
-19.29
```

This table is a parabolic approximation of a 16 pulse sinusoidal variation in the interpulse period. Actually, the radar would have benefited from a wider deviation in interpulse period than plus or minus 20%; the insensitivity at unit velocity could have been substantially reduced. However, wider deviation had to be sacrificed to prevent further notch degradation.

Typically, clutter in the radar beam must be suppressed by 40-60 db to make it small compared with the target of interest. The clutter has a velocity spectrum due to its motion (generally under one knot for trees, even in high winds) and the motion of the tips of the antenna (generally several knots). Aircraft speeds vary from 60 knots upward, but the radial component of this speed is the only component detectable by the MTI, so lower target range rates should be detectable. Ideally, targets below a critical range rate should be invisible, targets above this range rates should be detecable with full sensitivity, regardless of their velocity. This ideal MTI characteristic is more closely approximated than ever before possible when practicing the present invention.

FIG. 1 illustrates two ways in which variable weighting may be employed to improve the clutter notch. Curve B represents the ideal slope 3 characteristic, a significant improvement over the constant weighting case of curve A in the shape of the clutter notch. However, clutter suppression need not exceed a level determined by the radar cell size and the desired target of interest. At any selected level, the notch may be made 60% wider than the curve B by appropriate modification of weights. Curve C shows a notch widened in this fashion at the $-51$ db level; its width at this level is nearly double that of the constant weighted pulse response of curve A.

For purposes of clarity, a four pulse canceller will be utilized as an example for deriving the necessary modification of weights for obtaining a desired velocity response in the critical clutter notch region. If the customary binomial weighting of the four stored echoes is employed: namely, 1,3,3,1, it will be shown that the output contains not only the desired cubic function of velocity, curve B of FIG. 1, but also degrading terms having slopes 2 and 1 shown by curve A. A modification of the weighting factors will be derived, which eliminates these degradations, and the example will illustrate the degree to which these optimum weightings may be approximated.

Let the magnitudes of weighting of pulses A, B, C, and D be $a$, $b$, $c$, and $d$. The phase change between the echo pulses, which will be weighted and summed, is dependent upon target velocity ($v$) in radians per second and the interpulse period (T). Assuming a reference which will be intermediate between the B and C pulse:

$$\theta_{BC} = \theta = VT_2$$
$$\theta_{AB} = \theta - \Delta\theta_1 = vT_1 = vT_2 - v(T_2-T_1)$$
$$\theta_{CD} = \theta + \Delta\theta_2 = vT_3 = vT_2 + v(T_3-T_2)$$

Figure 2:
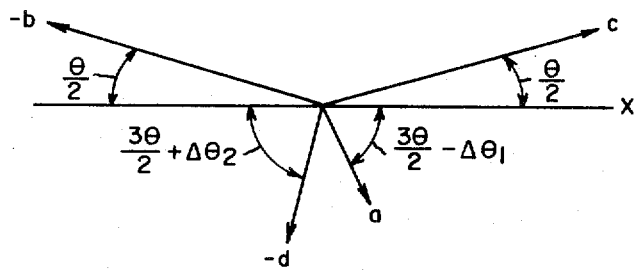
FIG. 2 is a vector diagram useful in understanding the operation of the present invention.

The weighting factors applied to four successive echoes of unit amplitude and their phase relationships are as illustrated in FIG. 2. FIG. 2 illustrates the vector summation performed by the canceller on a slow velocity target. All four echoes being compared are assumed to have identical amplitude (unity) so the amplitudes of the weighted echoes are $a$, $b$, $c$, and $d$. The four echoes have different phases because of the motion of the target. It is to be noted that the phase difference between echoes B and C is $\theta$. The zero or X axis is illustrated as a reference point between the echoes B and C. In other words the arrow deignated as X represents the phase of a signal at the midpoint between the pulse echoes B and C.

It can be shown that for all conditions whether with modest or large steps of interpulse period that the coefficients of four pulses in a sequence in the digital MTI radar namely for A, B, C and D the weighting factors $a$, $b$, $c$ and $d$ respectively are determined:

$$a \approx 1 + 3/2(\Delta T2/T2) + 1/2(\Delta T2/T2)^2$$
$$d \approx 1 - 3/2(\Delta T1/T1) + 1/2(\Delta T1/T2)^2$$
$$b \approx 4 - d - m - k$$
$$c \approx 4 - a - m - k$$

where $m = 4(\Delta T1/T2 - T2/T2) + [3 - 1/2(\Delta T1/T2 - \Delta T2/T2)]$
$(\Delta T1/T2)(\Delta T2/T2) - (\Delta T1/T2)^2 - (\Delta T2/T2)^2$ $a$ = coefficient of oldest echo
$b$ = coefficient of second oldest echo
$c$ = coefficient of third oldest echo
$d$ = coefficient of latest echo
$T_1$ = interval between pulses weighted $a$ and $b$
$T_2$ = interval between pulses weighted $c$ and $d$
$\Delta T_1 = T_2 - T_1$
$\Delta T_2 = T_3 - T_2$
$k$ = constant which produces null in velocity response at
$V = \sqrt{k/2\pi}$.

The choice of VIP sequence determines the response of the canceller to echoes from sources having radial velocities with the band of interest; 0.25 to 10, for example, may represent 25 to 1000 knot aircraft. Once the best VIP sequence is selected, the equations define the weighting coefficients which should be applied to the four echoes to provide the desired shape of response to echoes from low velocity sources; below 0.1, for example, may represent sources moving at less than 10 knots.

Assuming an extreme VIP characteristic of −25%, 0, +25%, 0 deviation from average interpulse period the ideal values for the weighted factors can be shown to be:

| Ideal values | Pulses in canceller | | | |
|---|---|---|---|---|
| | 1234 | 2341 | 3412 | 4123 |
| $a'$ | 1.434 | 1.135 | .652 | .832 |
| $b'$ | 3.325 | 2.952 | 2.543 | 3.051 |
| $c'$ | 2.543 | 2.952 | 3.325 | 3.051 |
| $d'$ | .652 | 1.135 | 1.434 | .832 |

To convert these desired weighting factors to binary terms the weights must be rounded off to a least significant bit of 1/16. The resultant values are:

| Ideal values | Pulses in canceller | | | |
|---|---|---|---|---|
| | 1234 | 2341 | 3412 | 4123 |
| $a''$ | 1.3750 | 1.1250 | .6250 | .8125 |
| $b''$ | 3.1875 | 2.8750 | 2.4375 | 2.9375 |
| $c''$ | 2.4375 | 2.8750 | 3.1875 | 2.9375 |
| $d''$ | .6250 | 1.1250 | 1.3750 | .8125 |

Figure 3:
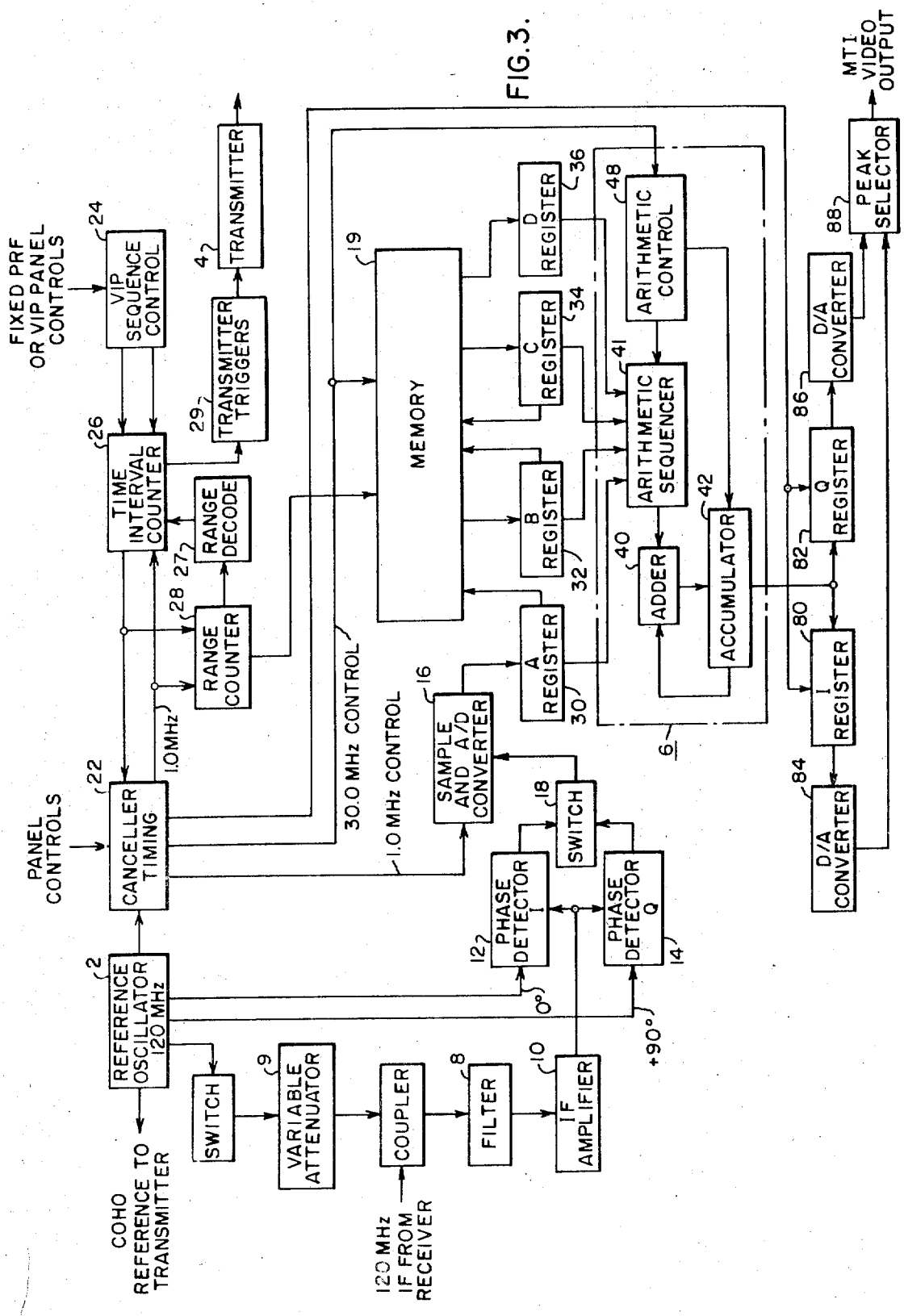
FIG. 3 is a schematic block diagram of an illustrative embodiment of the present invention.
Figure 4:
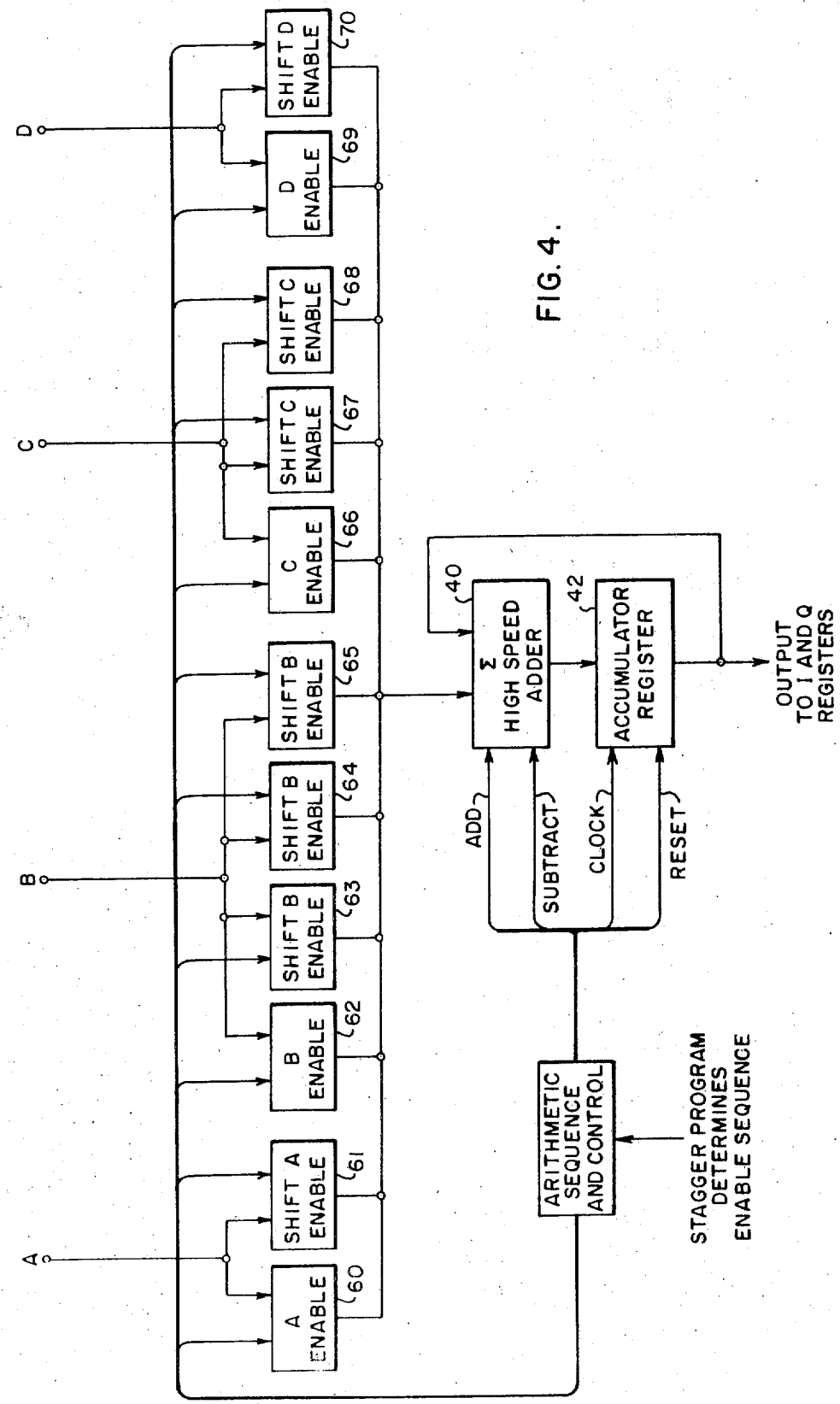
FIG. 4 is a schematic block diagram, in greater detail, of certain elements utilized in the illustrative embodiment of FIG. 3.

Once the weights have been successfully rounded off to a least significant bit of 1/16, implementation of the variable weighting factors in a digital MTI radar can be realized by reference to FIGS. 3 and 4.

A stable oscillator 2 will provide a coherent reference frequency for the transmitter 4 as well as the clock frequency for a digital canceller 6. The incoming IF signal, after suitable filtering and amplification at 8 and 10 respectively, will be directly converted to bipolar video by phase comparison with the reference frequency. Both in-phase and quadrature channels 12 and 14 are provided to improve detectability and to allow phase information to be extracted after cancellation, if desired. The analog information at the output of the phase detectors is alternately fed to a sample and A to D converter 16 by a switching gate 18. The analog information containing one component of the echo vector is sampled at a 2.7 microsecond rate and converted into an eight bit digital word.

The digital canceller 6 is a four pulse digital canceller which implements an equation $aA - bB + cC - dD$, where again the capital letters represent successive echo components in a range bin. A magnetic core stack 19 of 512 range word x 24 bits provides the necessary information storage.

The cnacelled signals in both in-pulse and quadrature channels are combined to provide an MTI viedo output.

A synchronizer 22 provides the necessary timing for the radar transmitter 4 as well as providing all internal timing for the canceller 6. All timing is derived from the 120 megahertz reference oscillator 2. A VIP sequence control 24 provides a program to VIP stagger in order to achieve the desired smooth velocity response. A time interval counter 26 inserts the desired variable interpulse period while a range counter 28 defines each range.

The pulse echo received from a target is amplified by the IF amplifier 10. The amplifier is chosen to have 20 megahertz bandwidth and provides well over 40 db gain. An attenuation control 9 is provided for exact adjustment of the gain. The amplifier 10 is preceded by a 200 kilohertz bandwidth crystal filter 8. The maximum level required by the phase detectors 12 and 14 is +5 dbm corresponding to a level, for the least significant bit, of −43 dbm. Since the noise input to the amplifier 10 is −80 dbm, the gain of the amplifier will be adequate.

The phase detector is divided into two balanced sections 12 and 14 using Schottky barrier diodes as detectors. An input level is injected into each detector from the coho oscillator 2. This is mixed with the amplified received signals. The output from each is then filtered and sent to the A to D converter 16. A 90° adjustable phase shifter is inserted in the out of phase or Q coho oscillator line to provide the desired quadrature phase relationship.

The bipolar video signal from the phase detectors 12 and 14 is sampled by the sample and hold circuit 16 and the amplitude is converted into a digital word. An in-phase (I) signal sample and a quadrature (Q) signal sample is taken through the switching gate 18 and converted every 5.4 microseconds. The output of the analog to digital converter 16 is selected to be seven bits of amplitude plus a sign bit. The I and Q channels are multiplexed into the A to D converter by the signal switch 18. (The linear dynamic range of the signal chain from the IF input to the AD converter will be 50 db minimum.)

The A to D converter 16 is a sequential converter using a voltage summing ladder network. A sample and hold circuit is of similar construction. The complete timing and control logic for the A to D converter and sample and hold circuits are self-contained and only two inputs are required to the converter 16; namely, the analog video and the sampling clock. When desirable, only the in-phase (I) signal sample need be resolved in which instance the resolution time can be cut in half.

The four pulse canceller equation implemented in the canceller logic is: $F = aA - bB + cC - dD$. For one group of four pulses the weights may be: $a = 7/8$, $b = 2^{13}/_{16}$, $c = 3^{1}/_{16}$, $d = 1^{1}/_{8}$.

A, B, C, and D represent the received signal occurring in a given sequence or range cell for four successive pulse repetition periods. These are in chronological order, A being the most recent. The coefficients $a$ through $d$ are independent multipliers for weighting factors as previously described. Two separate solutions are calculated for each range cell, one for the in-pulse component and one for the quadrature component.

Complete implementation of the canceller equation is achieved by shifting the entire digital word into a core memory 19. The memory 19 is range addressed by the range counter 28 such that each location in the memory 19 contains the three pulse history of a corresponding range cell. For each pulse transmission the oldest data in each range cell is shifted out of memory and the newest shifted in. That is, the A register 30 shifts the latest pulse into the memory 19 and subsequent registers 32, 34 and 36 shift each previous pulse with the oldest data pulse D, being shifted out of the memory 19. The four words are read simultaneously. The word representing pulse echo A is read from the A to D converter 16 while pulses B through D are read from the memory 19. The weighting coefficients previously discussed are applied to the data by the canceller 6. The resultant I output is resolved in less than 2.7 microseconds. Then Q is solved starting midway into the 5.4 microsecond range cell. Before the end of the 5.4 microsecond cell both I and Q have been solved and combined. The memory 19 has twice as many words as range cells to allow storage of I and Q data words. While each range cell is 5.4 microseconds, the memory 19 is capable of cycling at less than 2.5 microseconds. The circuitry performing the summing is an adder 40 fed by the arithmetic sequencer 41. Depending upon the interconnection of a subtractor could be used in place of the adder 40. The final sum from the adder 40 yields the canceller equation to an accumulator 42.

The complete arithmetic function A, B, C, and D registers and summers are further detailed in FIG. 4. An arithmetic control 48 enables each of the weighted binary gates and controls the adder 40 and accumulator register 42.

The reading of the accumulator 42 takes place in 12 steps in accordance with the following table:

ACCUMULATOR READING

| Step | |
|---|---|
| 1 | 0 |
| 2 | $A$ |
| 3 | $A - \frac{1}{8}A$ |
| 4 | $A - \frac{1}{8}A - 4B$ |
| 5 | $A - \frac{1}{8}A - 4B + B$ |
| 6 | $A - \frac{1}{8}A - 4B + B + B/8$ |
| 7 | $A - \frac{1}{8}A - 4B + B + B/8 + B/16$ |
| 8 | $A - \frac{1}{8}A - 4B + B + B/8 + B/16 + 4C$ |
| 9 | $A - \frac{1}{8}A - 4B + B + B/8 + B/16 + 4C - C$ |
| 10 | $A - \frac{1}{8}A - 4B + B + B/8 + B/16 + 4C - C + C/16$ |
| 11 | $A - \frac{1}{8}A - 4B + B + B/8 + B/16 + 4C - C + C/16 + D$ |
| 12 | $A - A/8 - 4B + B + B/8 + B/16 + 4C - C + C/16 + D + D/8$ |

Final Output $\frac{7}{8}A - 2\frac{13}{16}B + 3\frac{3}{16}C + 1\frac{1}{8}D$

To obtain the binary weighted factors necessary to provide the desired improvement in the width of the clutter notch at the required level of cancellation the gate 60 allows pulse A to the high speed adder 40 and also shifts the signal three places to the right to provide a binary division by 8 in the gate 61. Likewise gate 62 passes the signal B through and shifts the signal up to four places through gates 63, 64 and 65 to obtain division by the binary number 16. Pulse C is likewise shifted by gates 66, 67 and 68. Pulse echo D is allowed through to the adder 40 and is also shifted three places to provide a binary 8 division by gates 69 and 70. The resultant output from the accumulator register 42 is as indicated by the final output on the bottom line of the previous table namely $$\tfrac{7}{8}A - 2\tfrac{13}{16}B + 3\tfrac{3}{16}C + 1\tfrac{1}{8}D$$

Further representative values of the operation of the high speed adder in the canceller 6 is a high speed synchronizer 22 which operates at a 30 megahertz clock rate. The use of high speed logic allows the solution of the complete canceller equation without adding intermediate registers and reduces processing delays.

Processing delay will be 5.4 microseconds. Video sampled on a clock will be converted to a digital number in the next 1 microsecond. The second microsecond is for propagation through the arithmetic function of the in-phase component. Near the end of the 2.5 microsecond time, the data is clocked into the I register 80. Meanwhile Q has been converted and propagates through the arithmetic. At the end of 5.4 microseconds the output of both D to A converters assumes the cancelled video level. The in quadrature information Q is clocked into the Q register 82.

The digital output from the canceller 6 is converted to analog information in the two eight bit D to A converters 84 and 86. The canceller output will be digitally limited to eight bits for practical purposes. The A to D converters are of the voltage summing ladder type. The MTI video outputs are taken through a peak detector 88.

The range counter 28 counts the 185 kilohertz clock to define each discrete range cell. At minimum processing range the memory 19 begins to receive start pulses. Minimum range may be zero as well as any other desired range. The basic interpulse period is generated by the combined counting of the range counter 28 and the time interval counter 26. A particular pulse time-period is derived by decoding a discrete range in the range decode 27, which then initiates the time interval counter 26 at a fixed time. Another independent range-decode signals maximum range and terminates memory start signals until the next transmission.

The time interval counter 26 is se to a predetermined value and counted to initiate the transmission. The value to which the time interval counter is set is selected by the sequence control. The counter is set to eight different values. A fixed PRF or VIP may be selected in the VIP sequence control 24. In the VIP mode the interpulse period is varied in eight steps from $-6.86\%$ to $+7.14\%$ of the average time period. A frequency change trigger may be provided on a separate output if desired, once during each cycle of VIP.

The arithmetic control 48 has stored a set of four weighting coefficients $(a, b, c, d)$ appropriate for each of the eight points in the VIP cycle. It operates in synchronism with the VIP sequence control to optimize the canceller for the four echoes it is processing during that specific interpulse period.

Wtih the pulse echoes A, B, C, and D each having applied thereto their respective weighting factor by the canceller 6, one is able to achieve the benefits of variable interpulse period without the penalties. In so doing the width of the clutter notch is vastly improved as demonstrated by the graphical comparison of FIG. 1.

While the present invention has been described with a degree of particularity for the purpose of illustration, it is to be understood that all modifications, alterations or substitutions within the spirit and scope of the present invention are herein meant to be included.

I claim as my invention:

1. In an MTI radar system, the combination comprising; means for generating radar transmissions at a time interval which has a variable interpulse period; means for extracting one or both components of the echo vectors of said radar transmissions, in-phase or in quadrature with a reference signal; means for sampling said component at regular intervals in range; means for converting said range sample into a digital word; means for storing a sequence of said digital words; means for applying weighting coefficients to said sequence and the most recent digital word to occur which are dependent upon the interpulse periods between all pulses being weighted; means for summing said weighted sequence to obtain a digital solution; and means for converting said digital solution to an analog video display signal.

2. The combination of claim 1 wherein said weighting coefficients are dependent upon the interpulse periods (T) between all components being summed and said means for summing obtains a digital solution to four echo components A, B, C, and D.

3. The combination of claim 1 wherein the magnitudes of weighting of pulses A, B, C, and D are identified as $a, b, c,$ and $d$ with the weighting coefficients of variable interpulse periods being $$a \approx 1 + 3/2(\Delta T2/T2) + \tfrac{1}{2}(\Delta T28T2)^2$$
$$d \approx 1 - 3/2(\Delta T1/T1) + \tfrac{1}{2}(\Delta T1/T2)^2$$
$$b \approx 4 - d - m$$
$$c \approx 4 - a - m$$

where $$m = 4(\Delta T1/T2 - T2/T2) + [3\tfrac{1}{2}(\Delta T1/T2 - \Delta T2/T2)](\Delta T1/T2)(\Delta T2/T2) - (\Delta T1/T2)^2 - (\Delta T2/T2)^2$$

$a$ = coefficient of oldest echo
$b$ = coefficient of second oldest echo
$c$ = coefficient of third oldest echo
$d$ = coefficient of latest echo
$T_1$ = interval between pulses weighted $a$ and $b$
$T_2$ = interval between pulses weighted $b$ and $c$
$T_3$ = interval between pulses weighted $c$ and $d$
$\Delta T_1 = T_2 - T_1$
$\Delta T_2 = T_3 - T_2$.

4. The combination of claim 2 wherein a factor $k$ is subtracted from the coefficients $b$ and $c$ to further shape the bottom of the clutter notch, where $k$ equals a constant which produces null in velocity response at $V = \sqrt{k}/2\pi$.

References Cited

UNITED STATES PATENTS

| | | | |
|---|---|---|---|
| 3,343,162 | 9/1967 | Evans | 343—7.7 |
| 3,404,399 | 10/1968 | Eschner | 343—7.7 |

RODNEY D. BENNETT, JR., Primary Examiner

T. H. TUBBESING, Assistant Examiner

UNITED STATES PATENT OFFICE
CERTIFICATE OF CORRECTION

Patent No. 3,560,972          Dated February 2, 1971

Inventor(s)   John W. Taylor, Jr.

It is certified that error appears in the above-identified patent and that said Letters Patent are hereby corrected as shown below:

Column 4, line 73, "$d \approx 1 - 3/2\ (\Delta T1/T1) + 1/2\ (\Delta T1/T2)^2$" should read "$d \approx 1 - 3/2\ (\Delta T1/T2) + 1/2\ (\Delta T1/T2)^2$".

Column 5, line 2, "$m \approx 4\ (\Delta T1/T2 - T2/T2) + \ldots$" should read "$m \approx 4\ (\Delta T1/T2 - \Delta T2/T2) + \ldots$"

Column 8, line 72, "$a \approx 1 + 3/2\ (\Delta T2/T2) + 1/2\ (\Delta T28T2)^2$" sho read "$a \approx 1 + 3/2\ (\Delta T1/T2) + 1/2\ (\Delta T2/T2)^2$"

Column 8, line 73, "$d \approx 1 - 3/2\ (\Delta T1/T1) + 1/2\ (\Delta T1/T2)^2$ shou read "$d \approx 1 - 3/2\ (\Delta T1/T2) + 1/2\ (\Delta T1/T2)^2$".

Column 8, line 74, "$b \approx 4 - d - m$" should read "$b \approx 4 - d - m$

Column 8, line 75, "$c \approx 4 - a - m$" should read "$c \approx 4 - a - m$

Column 9, line 2, "$m = 4\ (\Delta T1/T2 - T2/T2) + \ldots$" should read "$m = 4\ (\Delta T1/T2 - \Delta T2/T2) + \ldots$".

Column 9, lines 2 and 3, "$\ldots + [3\ 1/2\ (\Delta T1/T2 - \Delta T2/T2)] \ldots$" should read "$\ldots + [3 - 1/2\ (\Delta T1/T2 - \Delta T2/T2)] \ldots$".

Signed and sealed this 28th day of November 1972.

(SEAL)
Attest:

EDWARD M. FLETCHER, JR.         ROBERT GOTTSCHALK
Attesting Officer                Commissioner of Pa